(12) United States Patent
Komiya

(10) Patent No.: US 10,047,825 B2
(45) Date of Patent: Aug. 14, 2018

(54) DEVICE FOR GUIDING LONG OBJECTS

(71) Applicant: TSUBAKIMOTO CHAIN CO., Osaka-shi, Osaka (JP)

(72) Inventor: Shoichiro Komiya, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 15/509,696

(22) PCT Filed: Sep. 14, 2015

(86) PCT No.: PCT/JP2015/076058
§ 371 (c)(1),
(2) Date: Mar. 8, 2017

(87) PCT Pub. No.: WO2016/047489
PCT Pub. Date: Mar. 31, 2016

(65) Prior Publication Data
US 2017/0284506 A1 Oct. 5, 2017

(30) Foreign Application Priority Data

Sep. 24, 2014 (JP) ................................. 2014-193961

(51) Int. Cl.
*F16G 13/16* (2006.01)
*F16G 13/06* (2006.01)
*H02G 11/00* (2006.01)

(52) U.S. Cl.
CPC ............. *F16G 13/06* (2013.01); *F16G 13/16* (2013.01); *H02G 11/00* (2013.01); *H02G 11/006* (2013.01)

(58) Field of Classification Search
CPC ......... F16G 13/06; F16G 13/16; H02G 11/00; H02G 11/006

(Continued)

(56) References Cited

U.S. PATENT DOCUMENTS 6,065,278 A 5/2000 Weber et al.
6,550,232 B1 4/2003 Achs et al.
(Continued)

FOREIGN PATENT DOCUMENTS

JP 2000-501482 A 2/2000
JP 2003-521638 A 7/2003
(Continued)

OTHER PUBLICATIONS

International Preliminary Report on Patentability (Form PCT/IB/373) issued in counterpart International Application No. PCT/JP2015/076058 dated Mar. 28, 2017, with Form PCT/ISA/237. (7 pages).

(Continued)

*Primary Examiner* — David B Jones
(74) *Attorney, Agent, or Firm* — Westerman, Hattori, Daniels & Adrian, LLP

(57) ABSTRACT

A device for guiding long objects comprises a plurality links. Each link has a pair of link portions that face each other in a first direction. The links are disposed and respectively connected in series along a second direction. Each pair of link portions is connected by a respective pair of arms at the two ends of the respective link in a third direction. In the accommodation space enclosed and formed by each pair of link portions and the respective pair of arms, a long object is accommodated. Two link portions that are adjacent in the second direction are connected by coupling portions. The coupling portions are configured from a second material with a higher wear resistance than the first material that configures the respective link portions. A space is formed between the two link portions on the entire circumference of the coupling portions.

5 Claims, 4 Drawing Sheets

(58) Field of Classification Search
USPC .......................................................... 59/78.1
See application file for complete search history.

(56) References Cited

U.S. PATENT DOCUMENTS

| | | | | |
|---|---|---|---|---|
| 7,497,072 | B2* | 3/2009 | Hermey | F16G 13/16 248/49 |
| 9,163,699 | B2* | 10/2015 | Jaeker | H02G 11/006 |
| 2009/0039196 | A1 | 2/2009 | Komiya et al. | |
| 2011/0121141 | A1 | 5/2011 | Tatsuya et al. | |

FOREIGN PATENT DOCUMENTS

| | | |
|---|---|---|
| JP | 2004-53005 A | 2/2004 |
| JP | 2009-41631 A | 2/2009 |
| JP | 2014-27749 A | 2/2014 |
| KR | 10-1999-0071745 A | 9/1999 |
| KR | 20-0230777 Y1 | 7/2001 |
| TW | 201121186 A1 | 6/2011 |

OTHER PUBLICATIONS

International Search Report dated Dec. 15, 2015, issued in counterpart International Application No. PCT/JP2015/076058 (2 pages).
Office Action dated Jun. 18, 2018, issued in counterpart Korean Application No. 10-2017-7007360, with English translation. (12 pages).

* cited by examiner ns is a first material. Two link portions that are adjacent to each other in the second direction are coupled to each other by coupling portions. The coupling portions are at least partially made of a second material having a wear resistance greater than that of the first material. A space is formed between the two link portions over an entire circumference of the coupling portions.

DEVICE FOR GUIDING LONG OBJECTS

BACKGROUND OF THE INVENTION

The present invention relates to a device for guiding a long object, which is, for example, a flexible cable for supplying electricity or a hose for supplying fluid to a movable unit, such as a machine tool, in accordance with movement of the movable unit with the long object accommodated in the device.

This type of device for guiding a long object is configured by coupling links, each of which has two link plates (link portions) that are opposed to each other, in the longitudinal direction. The link plates in each pair are coupled together by a first arm and a second arm that is opposed to the first arm (for example, refer to Patent Document 1). An accommodation space is formed by being surrounded by the link plates and the first and second arms. A long object is accommodated in the accommodation space.

Each link plate includes a coupling pin hole (a receiving portion) on the front-side lateral face portion. Each link plate includes a coupling pin (a projection) on the rear-side lateral face portion. Of two link plates that are adjacent to each other in the front-rear direction, the coupling pin provided for one link plate is fitted into the coupling pin hole provided for the other link plate. This rotationally couples the two link plates to each other.

PRIOR ART DOCUMENT

Patent Document

Patent Document 1: Japanese Laid-Open Patent Publication No. 2009-41631

SUMMARY OF THE INVENTION

When the device for guiding a long object disclosed in Patent Document 1 is in use and two link plates that are adjacent to each other in the front-rear direction rotate, the coupling pin hole of one of these link plates and the coupling pin of the other link plate are rubbed against each other. Furthermore, the side surfaces of the link plates are rubbed against each other. Thus, there is a problem that each link plate wears to generate abrasion powder.

Accordingly, it is an objective of the present invention to provide a device for guiding a long object that is capable of limiting generation of abrasion powder when the device is in use.

The means for achieving the objective and their operational advantages will be described.

To achieve the objective, a device for guiding a long object includes a plurality of links. The links are rotationally coupled together and form an accommodation space, which accommodates a long object. Each link includes two link portions that are opposed to each other in a first direction and two arms that couple the link portions to each other. The links are rotationally coupled together while being arranged in series in a second direction perpendicular to the first direction. Each link has a first end and a second end in a third direction that is perpendicular to both the first direction and the second direction. The link portions in each pair are coupled to each other by the associated arms at the first end and the second end of the associated link. The accommodation space is surrounded by the pairs of link portions and the arms and formed to extend in the second direction and accommodates the long object. A material of the link por- According to the configuration, when two of the link portions that are adjacent to each other in the second direction rotate, the coupling portions are rubbed against each other, while the link portions are not rubbed against each other. The coupling portions are at least partially made of the second material having a greater wear resistance than that of the first material, which configures the link portions. Thus, wear of the coupling portions is limited, and wear of the link portions is avoided. This limits generation of abrasion powder when the device for guiding a long object is in use.

In the device for guiding a long object, preferably, the space increases as a distance from the coupling portions increases.

According to the configuration, looseness between the link portions is limited in comparison with a case in which the measurement of the space is set to be uniform regardless of the distance from the coupling portions.

In the device for guiding a long object, preferably, the two link portions include a first opposing surface and a second opposing surface that are opposed to each other over the entire circumference of the coupling portions. The first opposing surface is formed by a flat surface. The second opposing surface is formed by an inclined surface that is inclined relative to the first opposing surface. The space is formed between the first opposing surface and the second opposing surface.

According to the configuration, looseness between the link portions is limited in comparison with a case in which both the first opposing surface and the second opposing surface in the two link portions are formed by inclined surfaces that are inclined such that the space between the first opposing surface and the second opposing surface is broader as a distance from the coupling portions increases.

In the device for guiding a long object, preferably, each link portion has a first end and a second end in the second direction. One of the two link portions is a first link portion, and the other is a second link portion. The coupling portions include a projection provided on the first end of the second link portion and a receiving portion provided on the second end of the first link portion, wherein the projection of the second link portion is inserted in the receiving portion to be rotational relative to each other. The projection and the receiving portion are made of the second material. The second material is elastomer.

According to the configuration, generation of rubbing noise is limited, and generation of abrasion powder is limited when the projection and the receiving portion rotate (slide) relative to each other while being rubbed against each other.

In the device for guiding a long object, preferably, the projection and the receiving portion are provided to each link portion by double molding. Each link includes restriction portions that are provided for the associated pair of link portions. The restriction portions restrict the projections and the receiving portions from falling off from the associated link portions.

According to the configuration, the restriction portions restrict the projections and the receiving portions from falling off from the respective link portions even when the link portions are not fused with the associated projection and receiving portion by double molding.

In the device for guiding a long object, preferably, when the projection of the second link portion and the receiving portion of the first link portion rotate relative to each other, a restriction portion that corresponds to the second link portion restricts the projection of the second link portion from rotating with respect to the second link portion, and a restriction portion that corresponds to the first link portion restricts the receiving portion of the first link portion from rotating with respect to the first link portion.

According to the configuration, the restriction portions restrict rotation of the projection and the receiving portion relative to the respective link portions. Since the projection and the receiving portion are prevented from being rubbed against the respective link portions, generation of abrasion powder is limited.

The present invention limits generation of abrasion powder when the device is in use.

DETAILED DESCRIPTION OF THE PREFERRED EMBODIMENTS

A device for guiding a long object according to one embodiment will now be described with reference to the drawings.

Figure 1:
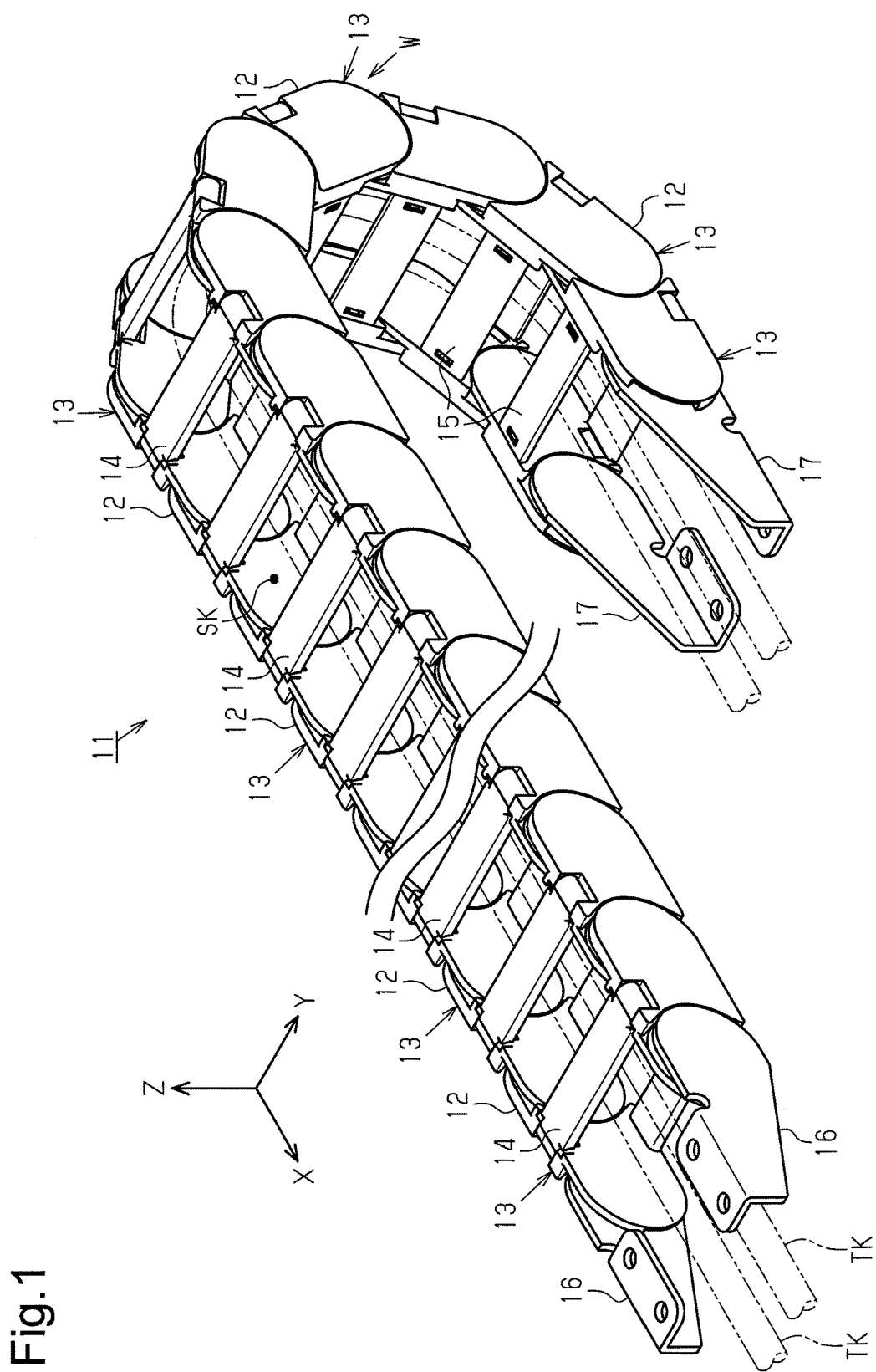
FIG. 1 is a perspective view of a device for guiding a long object according to one embodiment.

As shown in FIG. 1, a long object guiding device 11 includes links 13. Each link 13 includes two link portions 12, which are opposed to each other in a first direction Y. The links 13 are rotationally coupled in a state in which the links 13 are arranged in series in a second direction X perpendicular to the first direction Y. That is, the first direction Y corresponds to the width direction of the long object guiding device 11, and the second direction X corresponds to the extending direction of the long object guiding device 11.

The link portions 12 in each pair are coupled to each other by a first arm 14 and a second arm 15 at a first end and a second end in a third direction Z of the link 13. The first arm 14 and the second arm 15 each have a substantially rectangular plate shape. The third direction Z is perpendicular to both the first direction Y and the second direction X and corresponds to the thickness direction of the long object guiding device 11.

Each first arm 14 is detachably and rotationally mounted to the link portions 12 in the associated pair. Each second arm 15 is detachably mounted to the link portions 12 in the associated pair. In the first arms 14 and the second arms 15, which configure the long object guiding device 11, each first arm 14 and the associated second arm 15 are opposed to each other in the third direction Z.

Of the links 13, the link 13 that is located at the leading end in the second direction X is coupled to a first bracket 16, which is configured to be coupled to a movable body (not shown) that reciprocates in the second direction X. The link 13 that is located at the trailing end in the second direction X is coupled to a second bracket 17, which will be fixed to a fixing portion (not shown).

In the links 13, a space that is surrounded by pairs of link portions 12, the first arms 14, and the second arms 15 and formed to extend in the second direction X configures an accommodation space SK. The accommodation space SK accommodates long objects TK that can be flexibly bent. The long object guiding device 11 guides the long objects TK in accordance with the reciprocating movement of the movable body (not shown) coupled to the first bracket 16 while protecting the long objects TK accommodated in the accommodation space SK.

In this case, the long object guiding device 11 is arranged such that a curved portion W is formed in the middle portion. The curved portion W moves in accordance with reciprocating movement of the movable body (not shown) coupled to the first bracket 16 in the second direction X.

The long objects TK include, for example, an electric cable for supplying electricity to the movable body (not shown), an optical fiber cable for transmitting signals to the movable body (not shown), a hose for supplying gas (e.g., air) or liquid (e.g., water or oil) to the movable body (not shown), and a long articulated member capable of flexibly bending.

The configuration of the link portions 12 will now be described in detail.

Figure 2:
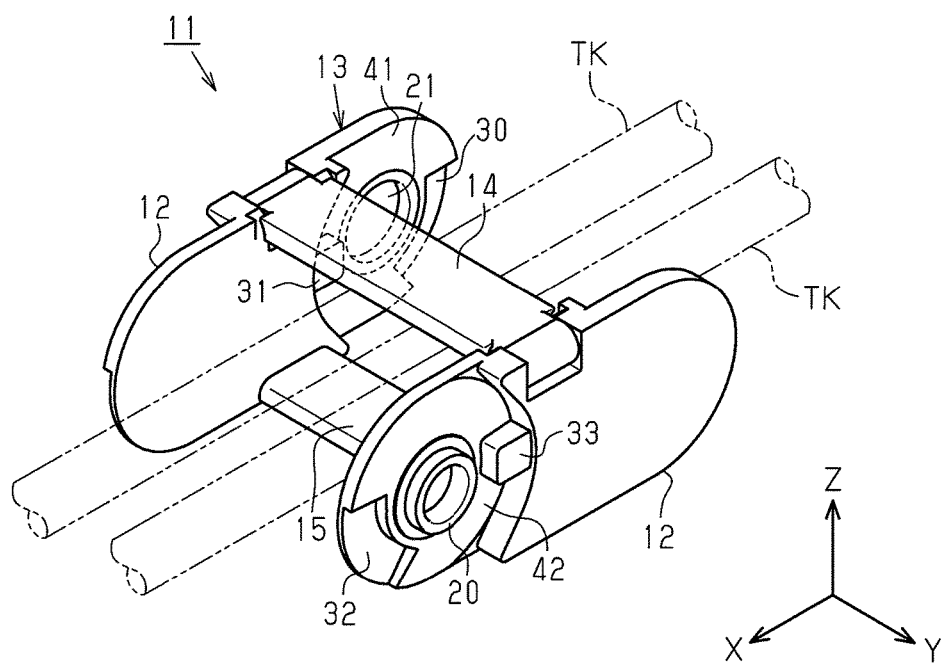
FIG. 2 is a perspective view illustrating a part of the device for guiding a long object of FIG. 1.
Figure 3:
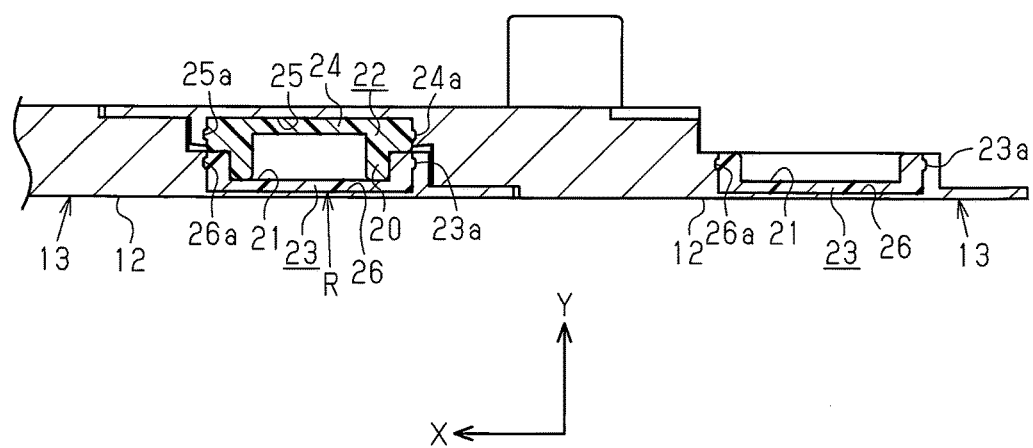
FIG. 3 is a cross-sectional plan view of coupling portions between link portions.

As shown in FIGS. 2 and 3, each link portion 12 is made of a plastic material and has a substantially rectangular plate shape with the rounded opposite ends in the second direction X. In the present embodiment, polyamide 6 is used as the plastic material. Each link portion 12 includes a first end and a second end in the second direction X. The first end includes an annular projection 20 on the outer side surface. The second end includes a receiving portion 21, which is annular shaped and recessed, on the inner side surface. The receiving portion 21 receives the projection 20 of the link portion 12 adjacent in the second direction X to be rotational relative to each other.

Figure 4:
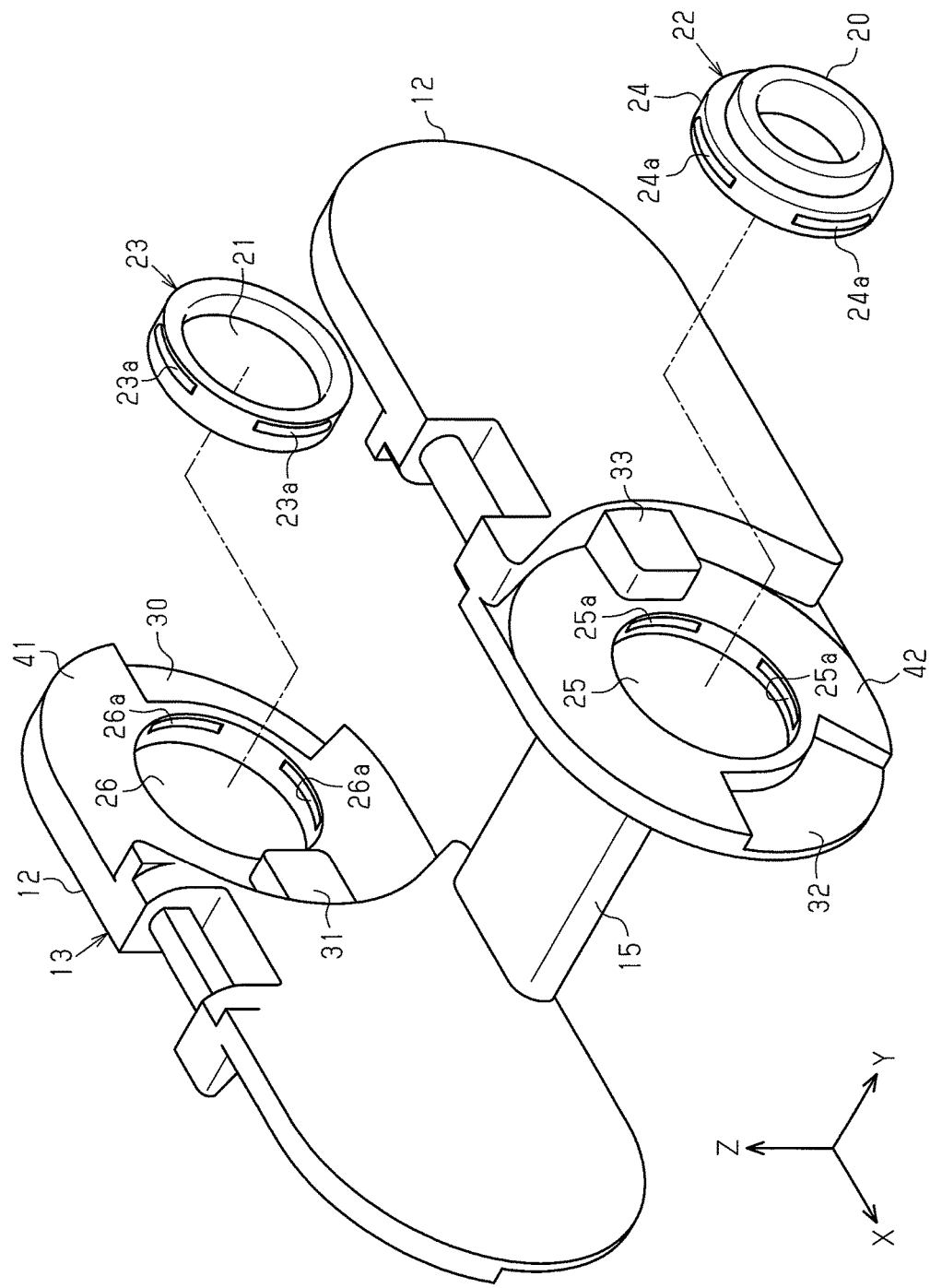
FIG. 4 is an exploded perspective view of a link with a projection and a receiving portion, which are dismounted from the link.

As shown in FIGS. 2 and 4, each projection 20 is configured by a first forming member 22, and each receiving portion 21 is configured by a second forming member 23. The first forming member 22 and the second forming member 23 are made of elastomer, which has a wear resistance greater than a material of the link portion 12 (the link 13), and are provided to the link portion 12 by double molding. That is, the projection 20 and the receiving portion 21 are provided to the link portion 12 by double molding.

The first forming member 22 includes the projection 20 and a disc-shaped joint portion 24. The projection 20 is integrally formed on one of the side surfaces of the joint portion 24. The outer circumferential surface of the joint portion 24 includes locking projections 24a, which are located at equal intervals in the circumferential direction. In the present embodiment, the locking projections 24a include four locking projections 24a. The outer side surface of the link portion 12 includes a circular outer accommodation recess 25, which is molded in a state in which the joint portion 24 of the first forming member 22 is accommodated by the outer accommodation recess 25. The inner circumferential surface of the outer accommodation recess 25 includes locking recesses 25a, which are formed to correspond to the locking projections 24a of the joint portion 24 of the first forming member 22. The locking projections 24a of the first forming member 22 are fitted to the locking recesses 25a of the link portion 12.

Therefore, in a state in which the first forming member 22 is integrally molded with the link portion 12 by double molding, each locking projection 24a of the joint portion 24 of the first forming member 22 is fitted to the associated locking recess 25a of the outer accommodation recess 25 of the link portion 12.

The second forming member 23 has a circular box shape with a bottom, and the interior configures the receiving portion 21. The outer circumferential surface of the second forming member 23 includes locking projections 23a, which are located at equal intervals in the circumferential direction. In the present embodiment, the locking projections 23a include four locking projections 23a. The inner side surface of the link portion 12 includes a circular inner accommodation recess 26, which is molded in a state in which the second forming member 23 is accommodated by the inner accommodation recess 26. The inner circumferential surface of the inner accommodation recess 26 includes locking recesses 26a, which are formed to correspond to the locking projections 23a of the second forming member 23. The locking projections 23a of the second forming member 23 are fitted to the locking recesses 26a of the link portion 12.

Therefore, in a state in which the second forming member 23 is integrally molded with the link portion 12 by double molding, each locking projection 23a of the second forming member 23 is fitted to the associated locking recess 26a of the inner accommodation recess 26 of the link portion 12. In the present embodiment, the projection 20 and the receiving portion 21 configure coupling portions R (see FIG. 3) in which two link portions 12 that are adjacent to each other in the second direction X are coupled. Furthermore, in the present embodiment, the locking projections 23a, the locking projections 24a, the locking recesses 25a, and the locking recesses 26a configure restriction portions that restrict the first forming member 22 and the second forming member 23 from falling off from the link portion 12. That is, each link 13 includes the restriction portions that restrict the first forming members 22 and the second forming members 23 from falling off from the link portions 12.

As shown in FIG. 2, the second end of each link portion 12 in the second direction X includes the receiving portion 21. A sectorial inner recess 30 is formed on the inner side surface of the second end of each link portion. A rectangular parallelepiped inner projection 31 is formed on the inner side surface of each link portion 12 at such a location that the inner projection 31 and the inner recess 30 sandwich the receiving portion 21 in the second direction X. The first end of each link portion 12 in the second direction X includes the projection 20. A sectorial outer recess 32 is formed on the outer side surface of the first end of each link portion. A rectangular parallelepiped outer projection 33 is formed on the outer side surface of each link portion 12 at such a location that the outer projection 33 and the outer recess 32 sandwich the projection 20 in the second direction X.

Of two links 13 that are adjacent to each other in the second direction X, the receiving portions 21 of one link 13 are fitted to the projections 20 of the other link 13. In this state, the outer projections 33 are accommodated inside the inner recesses 30, and the inner projections 31 are accommodated inside the outer recesses 32. Each inner projection 31 is configured to be able to slide inside the associated outer recess 32 by a predetermined angular range (in the present embodiment, a range of 50 degrees) in the circumferential direction of the receiving portion 21. Each outer projection 33 is configured to be able to slide inside the associated inner recess 30 by a predetermined angular range (in the present embodiment, a range of 50 degrees) in the circumferential direction of the receiving portion 21.

That is, the predetermined angular range corresponds to a rotational range (a rotational angular range) between two of the links 13 (the link portions 12) that are adjacent to each other in the second direction X. The inner side surface of the inner recess 30 is engaged with the outer side surface of the outer projection 33, and the inner side surface of the outer recess 32 is engaged with the outer side surface of the inner projection 31. This restricts the rotational range between the two links 13 (the link portions 12) that are adjacent to each other in the second direction X.

Figure 6:
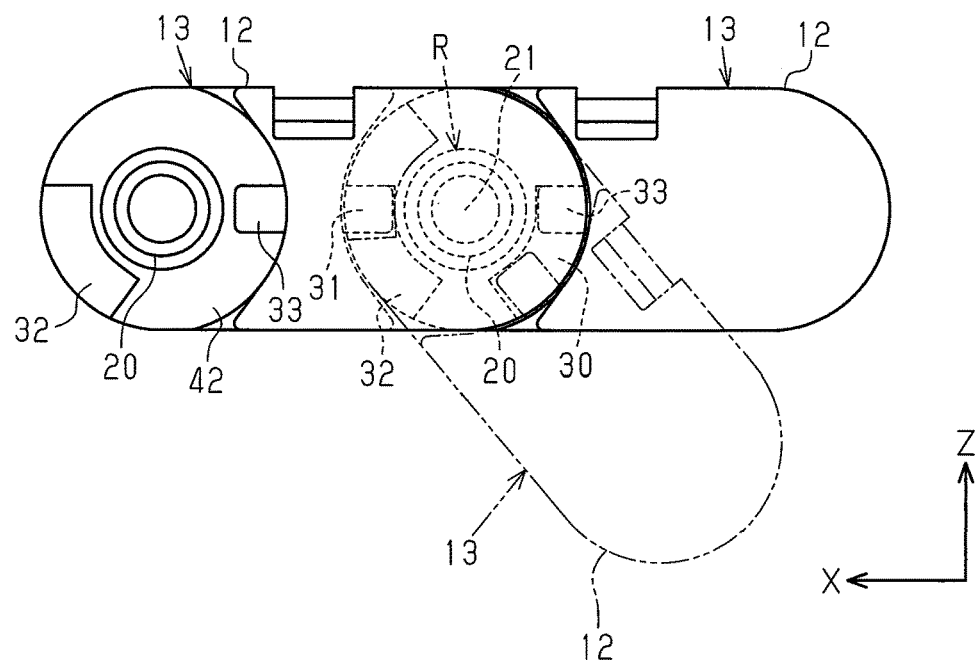
FIG. 6 is a side view of link portions when rotating.

In this case, as shown in FIG. 6, two of the link portions 12 (the links 13) that are adjacent to each other in the second direction X partially overlap in the first direction Y. The two link portions 12, which are adjacent to each other in the second direction X, rotate between a straight line position (the position indicated by solid lines in FIG. 6) in which the longitudinal axes of the two link portions 12 conform to each other and a curved position (the position indicated by long dashed two short dashed lines in FIG. 6) in which the longitudinal axes of the two link portions 12 cross at a predetermined angle (50 degrees in the present embodiment).

Figure 5:
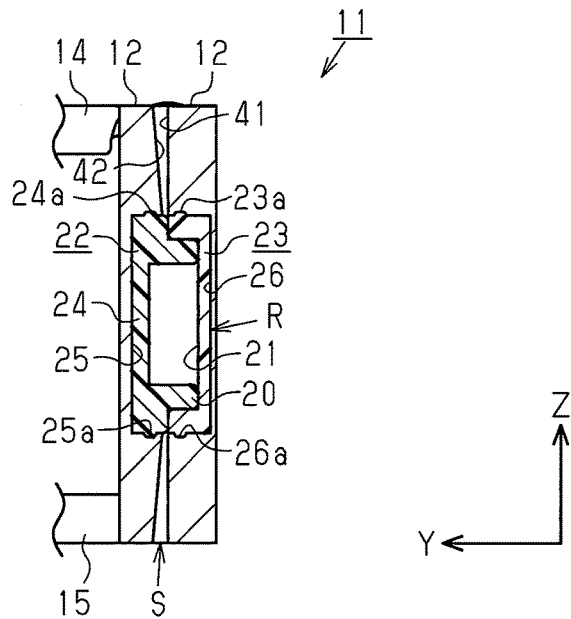
FIG. 5 is a vertical cross-sectional view of coupling portions between link portions.

As shown in FIGS. 2 and 5, in two of the links 13 that are adjacent to each other in the second direction X, two of the link portions 12 that are adjacent to each other in the second direction X include two opposing surfaces that are opposed to each other over the entire circumference of the coupling portions R (the receiving portion 21 and the projection 20) that couples the link portions 12 to each other. Of the two opposing surfaces, the opposing surface that includes the second forming member 23 configures an annular first opposing surface 41, and the opposing surface that includes the first forming member 22 configures an annular second opposing surface 42. The first opposing surface 41 is formed by a flat surface, and the second opposing surface 42 is formed by an inclined surface that is inclined relative to the first opposing surface 41. The second opposing surface 42 is inclined such that the distance between the second opposing surface 42 and the first opposing surface 41 in the first direction Y gradually increases as a distance from the coupling portions R increases.

Therefore, in a state in which, of two of the links 13 that are adjacent to each other in the second direction X, the receiving portions 21 of one link 13 are fitted (coupled) to the projections 20 of the other link 13, spaces S are formed between the link portions 12 over the entire circumference of the coupling portions R, that is, between the first opposing surfaces 41 and the second opposing surfaces 42. The spaces S gradually increase as distances from the coupling portions R increase.

Operation of the long object guiding device 11 in use will now be described.

When the movable body (not shown) makes reciprocating movement in the second direction X, the long object guiding device 11 makes reciprocating movement in the second direction X such that the curved portion W is displaced to follow the movable body (not shown). The accommodation space SK of the long object guiding device 11 accommodates the long objects TK. While being protected inside the accommodation space SK, the long objects TK are guided by the long object guiding device 11 in conjunction with the movement of the movable body (not shown). At this time, in the long object guiding device 11, two of the link portions 12 (the links 13) that are adjacent to each other in the second direction X repeatedly rotate between the straight line position and the curved position along with reciprocating movement of the curved portion W.

At this time, of the two link portions 12, which are adjacent to each other in the second direction X, the receiving portion 21 of one link portion 12 (a first link portion) and the projection 20 of the other link portion 12 (a second link portion) rotate relative to each other while being rubbed against each other. However, the space S is formed between the link portions 12 over the entire circumference of the coupling portions R that couple the two link portions 12 to each other. Thus, the link portions 12 are not rubbed against each other.

The first forming member 22 that forms the projection 20 and the second forming member 23 that forms the receiving portion 21 are made of elastomer, which has a wear resistance greater than the material of the link portions 12 (the links 13). This avoids wear of the link portions 12 caused by the link portions 12 being rubbed against each other. At the same time, wear of the coupling portions R, in which the link portions 12 are coupled to each other, is limited. Therefore, generation of abrasion powder is limited when the long object guiding device 11 is in use.

When the long object guiding device 11 is in use, of two of the link portions 12 that are adjacent to each other in the second direction X, the receiving portion 21 of one link portion 12 (the first link portion) is rubbed against the projection 20 of the other link portion 12 (the second link portion). At this time, when the frictional resistance between the receiving portion 21 and the projection 20 is large, the second forming member 23 and the first forming member 22 are apt to rotate with respect to the associated link portions 12. That is, the second forming member 23 is apt to rotate with respect to the one link portion 12 (the first link portion), and the first forming member 22 is apt to rotate with respect to the other link portion 12 (the second link portion).

However, in the present embodiment, the locking projections 23a of the second forming member 23 are fitted to the respective locking recesses 26a of the inner accommodation recess 26 of the associated link portion 12. Furthermore, the locking projections 24a of the joint portion 24 of the first forming member 22 are fitted to the respective locking recesses 25a of the outer accommodation recess 25 of the associated link portion 12. Thus, rotation of the second forming member 23 and the first forming member 22 with respect to the respective link portions 12 is restricted. Therefore, the second forming member 23 and the first forming member 22 are prevented from being rubbed against the respective link portions 12. Thus, generation of abrasion powder is limited.

The embodiment, which is described above in detail, achieves the following advantages.

(1) In the long object guiding device 11, two of the link portions 12 that are adjacent to each other in the second direction X are coupled to each other by the coupling portions R. The coupling portions R are made of the second material, which has a wear resistance greater than that of the first material, which configures the link portions 12. The space S is formed between the link portions 12 over the entire circumference of the coupling portions R. Thus, when the two link portions 12, which are adjacent to each other in the second direction X, rotate, the coupling portions R, which are made of the second material, which has a wear resistance greater than that of the first material, which configures the link portions 12, are rubbed against each other, while the link portions 12 are not rubbed against each other. Therefore, wear of the link portions 12 is avoided, while wear of the coupling portions R is limited. As a result, when the long object guiding device 11 is in use, generation of abrasion powder is limited. In addition, the space S is formed between the link portions 12 over the entire circumference of the coupling portions R. Thus, when the long object guiding device 11 is in use, even if force is applied to the links 13 coupled in the second direction X to twist, the link portions 12 that are adjacent to each other in the second direction X are restricted from being rubbed against each other.

(2) In the long object guiding device 11, each space S increases as a distance from the associated coupling portions R increases. This limits looseness between the link portions 12 in comparison with a case in which the space S is set to be uniform regardless of the distance from the coupling portions R.

(3) In the long object guiding device 11, two of the link portions 12 that are adjacent to each other in the second direction X include the first opposing surface 41 and the second opposing surface 42 that are opposed to each other over the entire circumference of the coupling portions R. The first opposing surface 41 is formed by a flat surface, and the second opposing surface 42 is formed by an inclined surface that is inclined relative to the first opposing surface 41. This forms the space S between the first opposing surface 41 and the second opposing surface 42. Thus, looseness between the link portions 12 is limited in comparison with a case in which both the first opposing surface 41 and the second opposing surface 42 are formed by inclined surfaces that are inclined such that the space S increases as a distance from the coupling portions R increases. In addition, since the second opposing surface 42 is formed by an inclined surface that is inclined relative to the first opposing surface 41, the links 13 are easily mounted.

(4) In the long object guiding device 11, each link portion 12 includes a first end and a second end in the second direction X. Of two of the link portions 12 that are adjacent to each other in the second direction, one link portion 12 is a first link portion, and the other link portion 12 is a second link portion. The coupling portions R include the projection 20 provided on the first end of the second link portion and the receiving portion 21 that is provided on the second end of the first link portion and in which the projection 20 of the second link portion is inserted to be rotational relative to the receiving portion 21. The projection 20 and the receiving portion 21 are made of elastomer, which corresponds to the second material. Thus, when the projection 20 and the receiving portion 21 rotate (slide) relative to each other while being rubbed against each other by using the long object guiding device 11, generation of rubbing noise is limited, and generation of abrasion powder is limited.

(5) In the long object guiding device 11, the projection 20 and the receiving portion 21 are provided to each link portion 12 by double molding. Each link 13 includes the restriction portions, which are provided for the associated pair of link portions 12 and restrict the projections 20 and the receiving portions 21 from falling off from the respective link portions 12. Thus, even if each link portion 12 is not fused with the projection 20 and the receiving portion 21 by double molding, the restriction portions restrict the projection 20 and the receiving portion 21 from falling off from the link portion 12.

(6) In the long object guiding device 11, when the projection 20 of the second link portion and the receiving portion 21 of the first link portion rotate relative to each other, the restriction portion corresponding to the second link portion restricts the projection 20 (the first forming member 22) of the second link portion from rotating with respect to the second link portion. At the same time, the restriction portion corresponding to the first link portion restricts the receiving portion 21 (the second forming member 23) of the first link portion from rotating with respect to the first link portion. Thus, the restriction portions restrict the projection 20 and the receiving portion 21 from rotating with respect to the respective link portions 12, and the projection 20 and the receiving portion 21 are prevented from being rubbed against the respective link portions 12. This limits generation of abrasion powder.

Modifications

The above-illustrated embodiment may be modified as follows.

The restriction portions (the locking projections 23a, the locking projections 24a, the locking recesses 25a, and the locking recesses 26a) do not necessarily have to restrict the projection 20 (the first forming member 22) and the receiving portion 21 (the second forming member 23) from rotating with respect to the respective link portions 12 when the projection 20 and the receiving portion 21 rotate relative to each other. That is, the four locking recesses 25a may be connected continuously to be annular, and the four locking recesses 26a may be connected continuously to be annular. In this case, the four locking projections 23a may be connected continuously to be annular, and the four locking projections 24a may be connected continuously to be annular.

The projection 20 (the first forming member 22) and the receiving portion 21 (the second forming member 23) do not necessarily have to be provided to each link portion 12 by double molding. The projection 20 (the first forming member 22) and the receiving portion 21 (the second forming member 23) may be assembled or adhered to the link portion 12.

The restriction portions (the locking projections 23a, the locking projections 24a, the locking recesses 25a, and the locking recesses 26a), which restrict the projection 20 (the first forming member 22) and the receiving portion 21 (the second forming member 23) from falling off from the associated link portion 12, may be omitted. In this case, when the projection 20 (the first forming member 22) and the receiving portion 21 (the second forming member 23) are provided by double molding with respect to each link portion 12, a material of the link portion 12 and a material of the projection 20 (the first forming member 22) and the receiving portion 21 (the second forming member 23) are preferably selected to have compatibility between these materials.

The projection 20 (the first forming member 22) and the receiving portion 21 (the second forming member 23) do not necessarily have to be made of elastomer.

Any one of the projection 20 (the first forming member 22) and the receiving portion 21 (the second forming member 23) may be formed of the same material as the link portion 12 to be integrated with the link portion 12.

The second opposing surface 42, which is configured by one of two opposing surfaces of link portions 12 that are opposed to each other over the entire circumference of the coupling portions R, may be formed by a flat surface. The first opposing surface 41, which is configured by the other opposing surface, may be formed by an inclined surface that is inclined relative to the second opposing surface 42. The flat second opposing surface 42 and the inclined first opposing surface may form the space S. Alternatively, both the first opposing surface 41 and the second opposing surface 42 may be formed by inclined surfaces that are inclined relative to a flat surface perpendicular to the first direction Y, and the first opposing surface 41 and the second opposing surface 42, which are each formed by the inclined surface, may form the space S.

The space S does not necessarily have to be formed such that the space increases as a distance from the coupling portions R increases. For example, the measurement of the space S in the first direction Y may be uniform.

The projection 20 (the first forming member 22) and the receiving portion 21 (the second forming member 23) may be made of different materials (e.g., elastomer). It is less likely to cause wear in comparison with a case in which the projection 20 and the receiving portion are made of the same material.

The outer accommodation recess 25 and the inner accommodation recess 26 may be configured by through holes formed to penetrate through the associated link portion 12 in the first direction Y.

The second arm 15 and the associated pair of link portions 12 may be formed by integral molding.

DESCRIPTION OF REFERENCE NUMERALS

11 . . . long object guiding device, 12 . . . link portion, 13 . . . link, 14 . . . first arm, 15 . . . second arm, 20 . . . projection, 21 . . . receiving portion, 23a . . . locking projection configuring a restriction portion, 24a . . . locking projection configuring a restriction portion, 25a . . . locking recess configuring a restriction portion, 26a . . . locking recess configuring a restriction portion, 41 . . . first opposing surface, 42 . . . second opposing surface, R . . . coupling portion, S . . . space, SK . . . accommodation space, TK . . . long object, X . . . second direction, Y . . . first direction, Z . . . third direction.

The invention claimed is:

1. A device for guiding a long object comprising a plurality of links, wherein the links are rotationally coupled together and form an accommodation space, which accommodates a long object, wherein:

each link includes two link portions that are opposed to each other in a first direction and two arms that couple the link portions to each other, the links are rotationally coupled together while being arranged in series in a second direction perpendicular to the first direction, each link has a first end and a second end in a third direction that is perpendicular to both the first direction and the second direction, the link portions in each pair are coupled to each other by the associated arms at the first end and the second end of the associated link, the accommodation space is surrounded by the pairs of link portions and the arms and formed to extend in the second direction and accommodates the long object, a material of the link portions is a first material, two link portions that are adjacent to each other in the second direction are coupled to each other by coupling portions, the coupling portions are at least partially made of a second material having a wear resistance greater than that of the first material, a space is formed between the two link portions around an entire circumference of the coupling portions, and around the entire circumference of the coupling portions, the space increases as a distance from the coupling portions increases.

2. The device for guiding a long object according to claim 1, wherein:
the two link portions include a first opposing surface and a second opposing surface that are opposed to each other around the entire circumference of the coupling portions,
the first opposing surface is formed by a flat surface,
the second opposing surface is formed by an inclined surface that is inclined relative to the first opposing surface, and
the space is formed between the first opposing surface and the second opposing surface.

3. The device for guiding a long object according to claim 1, wherein:
each link portion has a first end and a second end in the second direction,
one of the two link portions is a first link portion, and the other is a second link portion,
the coupling portions include a projection provided on the first end of the second link portion and a receiving portion provided on the second end of the first link portion, wherein the projection of the second link portion is inserted in the receiving portion to be rotational relative to each other,
the projection and the receiving portion are made of the second material, and
the second material is elastomer.

4. The device for guiding a long object according to claim 3, wherein:
the projection and the receiving portion are provided to each link portion by double molding,
each link includes restriction portions that are provided for the associated pair of link portions, and
the restriction portions restrict the projections and the receiving portions from falling off from the associated link portions.

5. The device for guiding a long object according to claim 4, wherein when the projection of the second link portion and the receiving portion of the first link portion rotate relative to each other, a restriction portion that corresponds to the second link portion restricts the projection of the second link portion from rotating with respect to the second link portion, and a restriction portion that corresponds to the first link portion restricts the receiving portion of the first link portion from rotating with respect to the first link portion.

* * * * *